United States Patent [19]

Vandegaer

[11] 4,091,200
[45] May 23, 1978

[54] ETHYLENE-VINYL ACETATE COPOLYMERIZATION PROCESS

[75] Inventor: Jan Edmond Vandegaer, Pasadena, Md.

[73] Assignee: Dart Industries Inc., Los Angeles, Calif.

[21] Appl. No.: 780,632

[22] Filed: Mar. 23, 1977

[51] Int. Cl.$^2$ .............................. C08F 6/00; C08F 6/26
[52] U.S. Cl. ...................................... 528/495; 526/68; 526/331
[58] Field of Search ................... 528/495; 526/68, 331

[56] References Cited
U.S. PATENT DOCUMENTS 3,466,265  9/1969  Alexander et al. .................. 260/78.5
3,509,115  4/1970  French ................................ 260/87.3

Primary Examiner—Stanford M. Levin
Attorney, Agent, or Firm—Margareta Le Maire; Bryant W. Brennan; Fred S. Valles

[57] ABSTRACT

In the production of ethylene-vinyl acetate copolymers in a free radical catalyst initiated high pressure process, explosive decomposition is prevented by contacting the reactor effluent downstream of the reactor outlet with small amounts of a hindered phenolic compound, separating unreacted monomer from the mixture of copolymer, unreacted monomer and scavenger in a separation zone and recycling the separated monomer to the reactor.

11 Claims, No Drawings

ETHYLENE-VINYL ACETATE COPOLYMERIZATION PROCESS

BACKGROUND OF THE INVENTION

Ethylene-vinyl acetate copolymers are well known commercial resins which have excellent properties e.g. clarity and heat sealability, which render them particularly useful in applications such as extrusion coating and packaging. Usually, the polymers are produced by co-polymerizing ethylene and vinyl acetate in the presence of a free radical catalyst at elevated temperatures, e.g. from about 250° to about 600° F, and at very high pressures, e.g. from about 20,000 psi to about 50,000 psi. The reaction mixture withdrawn from the polymerization reactor is then reduced in pressure and separated in a high pressure separation zone into polymer product and unreacted monomer, the latter being recycled to the polymerization zone. The reduction in pressure of the total effluent from the reactor is accompanied by a sizable increase of the temperature of the effluent due to the inverse Joule-Thomson effect. It has been found that the severe conditions present in the high pressure separation zone are conducive to decomposition of the polymerized and/or unreacted vinyl acetate causing the formation of degradation products, e.g. acetic acid, which imparts an objectionable odor to the polymer product. Various methods have been disclosed in the prior art either for the removal of the malodorous contaminants from the polymer or the prevention of the formation of such contaminants from the polymer or for the prevention of the formation of such contaminants. For instance, in the latter category a technique has been disclosed in U.S. Pat. No. 3,509,115 involving reducing the temperature of the reactor effluent in the separation zone by introduction of at least part of the ethylene monomer feed into said separation zone. Although this method appears to function satisfactorily for its intended purpose, it has some economical disadvantages. Specifically, it is necessary to treat the unreacted monomer separated in the separation zone for removal of low molecular weight polymer by-product and also of polymer fines prior to introduction of the recycle monomer stream into the reactor. By the introduction of additional quantities of monomer into the separation zone, the size and therefore both capital and operating costs of equipment associated with the aforementioned necessary treatments are considerably increased.

It was found during the course of the experimentation leading up to the present invention that if no precaution is taken to prevent the formation of degraduation products in the process, these contaminants build up in the reaction loop as they are being returned to the polymerization zone with the unreacted monomer. After a relatively short time, e.g. 5 hours or less, the concentration of the contaminants will reach a critical level, causing an explosive decomposition of the copolymer formed in the reactor.

Explosive decomposition is known to occur in continuous free radical induced high pressure processes for the production of copolymers of ethylene and esters of fumaric acid or maleic acid. U.S. Pat. No. 3,466,265 discloses that this phenomenon is caused by the formation in the polymerization zone of so-called super molecules due to an intramolecular transfer mechanism. In the process of the patent, this formation is prevented by introducing into the reaction zone from 0.00005 to 0.00018 moles of a hindered phenolic compound per mole of total monomer feed. It is essential that the phenolic additive be present in the reaction zone during the formation of the polymer product. A serious drawback of introducing phenolic compounds into the reaction zone is that the compounds are free radical scavengers and therefore greatly inhibit the desired generation of free radicals from the initiators i.e. the peroxide catalysts. Consequently, a several-fold increase in the catalyst rate is needed to offset the inhibiting effect of the phenolic compound. The combined cost of the additive and the incremental catalyst per unit weight of polymer is quite substantial and could be prohibitive, if the process of the patent was to be modified to the production of ethylene-vinyl acetate copolymers, which are relatively low priced resins.

It is therefore an object of the present invention to provide an improved process for the production of ethylene-vinyl acetate copolymers, wherein explosive decomposition of the polymer is prevented.

THE INVENTION

As mentioned above, in the experimentation leading up to the present invention, it was found that the real problem of explosive decomposition of ethylene-vinyl acetate copolymers could be attributed to the build-up of decomposition products within the reaction loop. This problem has now been solved by introducing a hindered phenolic compound into the reactor effluent of copolymer and unreacted monomers at a location downstream from the reactor to provide a mixture of copolymer, unreacted monomers and hindered phenolic compound in the separator. The unreacted monomer, which is recovered from the separator and recycled to the reaction zone is substantially free of harmful decomposition products, which can otherwise accumulate within the system and initiate an explosive decomposition.

Broadly, the invention pertains to a process for the preparation of ethylene-vinyl acetate copolymers in which (a) ethylene and vinyl-acetate are introduced to a polymerization zone;

(b) said ethylene and vinyl acetate are reacted in the presence of a free radical catalyst in said polymerization zone at elevated pressures and temperatures;

(c) the resulting reaction mixture is passed from the polymerization zone through a pressure reduction zone into a separation zone;

(d) the reaction mixture is separated into unreacted monomer and ethylene-vinyl acetate copolymer and;

(e) the unreacted monomer is recycled to the polymerization zone, the improvement which comprises: introducing into the reaction mixture of unreacted monomer and ethylene-vinyl acetate copolymer at a location downstream from the polymerization zone a hindered phenolic compound in amounts ranging from about $6 \times 10^{-7}$ moles to about $4 \times 10^{-5}$ moles of phenolic nuclei per mole of total monomer feed to the polymerization zone.

The continuous polymerization reaction can be conducted either in a tubular reaction zone or in a stirred autoclave. The concentration of vinyl acetate in the total monomer feed can range from about 0.5 weight percent to about 50 weight percent, preferably between about 1 weight percent to about 20 weight percent. The reactor conditions include pressures from about 20,000 psig to about 50,000 psig, preferably from about 23,000 to about 40,000 psig, and temperatures in the range between about 250° and about 600° F, preferably between about 400° and about 550° F. The reaction is carried out in the presence of any of the well known conventional free radical catalysts in amounts usually maintained in the range from about 0.01 to about 10 parts per 1000 parts of the copolymer product. Examples of suitable catalysts include peroxy compounds, such as t-butyl peroxide, t-butyl peroctoate, t-butyl perbenzoate, t-butyl peracetate, t-butyl perisobutyrate and many others.

The effluent from the reaction zone, i.e. polymer product and unreacted monomer, is reduced in pressure and introduced into a so-called high pressure separation zone, which is usually maintained at a pressure in the range from about 3000 psig to about 6000 psig. Due to the inverse Joule-Thomson effect, the temperature of the effluent after the aforementioned pressure reduction will increase, resulting in temperature of about 20° to about 165° F higher than that of the effluent exiting the polymerization zone. After separation the unreacted monomer stream from the high pressure separator is usually purified by passing it through one or more condensers to remove undesired low-molecular weight by-products and through one or more filters to remove entrained polymer fines. After compression, the purified unreacted monomer is then recycled to the reactor. The copolymer product separated in the high pressure separator is introduced after further pressure reduction e.g. to a pressure in the range from about 2 psig to about 20 psig, into a low pressure separation zone, where further quantities of unreacted monomer is removed from the product.

The hindered phenolic compound is introduced into the total polymerization effluent downstream of the polymerization zone. The point of introduction may be located anywhere from immediately adjacent the reactor exit to and including the high pressure separator. Preferably, the hindered phenol is introduced into the effluent prior to pressure reduction, however, it is entirely feasible to add it into the high pressure separator. The rate of addition of the compound is very small, i.e. from about $6 \times 10^{-7}$ moles to $4 \times 10^{-5}$ moles of phenolic nuclei per mole of total monomer fed to the inlet of the polymerization zone. Advantageously the rate is maintained between about $2 \times 10^{-6}$ and about $3 \times 10^{-5}$ moles/mole.

The hindered phenolic compound can be any one of the well known additives commonly used in stabilization of polyolefins, e.g. polypropylene. In general, these phenolic compounds contain one or more phenolic nuclei represented by the following structure

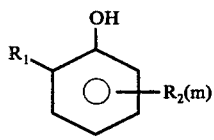

(1)

wherein $R_1$ is an alkyl or an alkylene group having from 1 to 5 carbon atoms, preferably a branched alkyl group. Each $R_2$ can independently be selected from hydrogen, hydroxyl, alkyl, alkylene, alkoxy or aryl groups. The number m of $R_2$ groups can range between 1 and 5. Also, it is preferred that one $R_2$ group is positioned in the ring structure adjacent to the hydroxyl group. The following is a partial list of hindered phenolic compounds that can be used in the process: 2,6-diisopropyl phenol, 2,6-di-t-butyl phenol, 2,6-di-t-butyl-4 methyl phenol, 2,5-di-t-amyl hydroquinone, 4 hydroxymethyl-2,6-di-t-butyl phenol, 2,2'-ethylene bis (4-methyl-6-t-butyl phenol), 4,4'-methylene bis (6-t-butyl ortho cresol), 4,4'-methylene bis (2,6-di-t-butyl phenol), 2,4,6-tri-t-butyl phenol, and the like. Other hindered phenolic compounds, which can be used in the invention are the mono and polyesters of alkane polyols, wherein the ester group or groups are derived from $C_2$-$C_7$ alkanoic acids containing a terminal phenolic nucleus of the general structure shown above. Specific examples of such compounds include the esters of such polyols as ethylene glycol, propanediols, butanediols, hexanediols, heptanediols, butane triols, glycerol, neopentyl glycol, erythritol, pentaerythritol, sorbitol, and the like.

Suitable hindered phenolic compounds include also the polymeric condensation products of phenol and formaldehyde. Many other hindered phenolic compounds not specifically mentioned above can obviously be used as the additive in the process of the present invention.

By practicing the invention it is possible to continuously polymerize ethylene and vinyl acetate on a large scale without experiencing explosive decomposition of the polymer product. In addition, no deleterious effect on the quality of the copolymer product is experienced in this process, in fact, since decomposition of polymerized and unreacted vinyl acetate is prevented in this process, the product is exceptionally free of objectionable odor.

The following examples are presented for a further illustration of the invention.

EXAMPLES 1–3

Comparative experiments were carried out in the manner described below.

Into an autoclave equipped with a stirrer was fed a mixture of 96 wt% ethylene and 4 wt% vinyl acetate at a rate of about 1750 lbs/hours. Catalyst, t-butyl peroxide, was fed to the reactor at a rate of about 0.04 to 0.06 parts by weight per 1000 parts copolymer produced. The reactor pressure was maintained at 35,000 psig and the temperature at a maximum of 490° F. The effluent was reduced in pressure to about 4200 psig and then introduced into a high pressure separation zone. Due to the Joule-Thomson inverse effect the temperature of the effluent increased considerably, and temperatures in the range of 574° to 603° F were observed on the effluent after pressure reduction. The unreacted monomer was separated, purified and returned to the autoclave as recycle.

There was no addition of a hindered phenol in Example 1 and explosive decomposition occurred during the experiment in a very short time, i.e. after one hour. In Example 2, which was a repeat of Example 1, it was only possible to run for five hours before decomposition. The products recovered after the decompositions were black indicating considerable concentrations of carbon in the polymer products.

The procedure was repeated in the Example 3 except that a hindered phenol, pentaerythritol tetraester of 3(3,5-di-t-butyl, 4-hydroxy phenyl) propionic acid, was introduced at a location adjacent but downstream of the reactor exit at a rate of 200 ppm based on the monomer feed rate, i.e. $2 \times 10^{-5}$ moles of phenolic nuclei/mole of total monomer feed to the reactor. The experiment was conducted for 21 hours, at which time it had to be discontinued due to an upset in the catalyst rate. No explosive decomposition was observed prior to said upset and there was no indication of the presence of free carbon in the product.

EXAMPLE 4

An experiment was carried out using a similar procedure to that of Example 3. A mixture of 91.6 wt% ethylene and 8.4 wt% vinyl acetate was fed to the autoclave at a rate of about 1750 lbs/hour and polymerized at 450° F and 28,000 psig in the presence of t-butyl peroctoate catalyst which was added at a rate 0.577 parts by weight per 1000 parts polymer product. $6 \times 10^{-6}$ moles of 2,6-di-t-butyl-4 methyl phenol per mole of total monomer feed was added to the polymerization effluent just after its exit from the reactor. The temperature of the effluent after pressure reduction to 4200 psig was fluctuating between 510° to 528° F during the 13 hours duration of the experiment. No explosive decomposition occurred and a product was recovered free from any degradation.

EXAMPLE 5

This experiment was carried out using the following modifications to Example 3: Vinyl acetate/ethylene weight ratio: 3.6:96.4; total monomer feed rate: 1660 lbs/hr; catalyst rate 0.07 lbs/1000 pounds polymer product; hindered phenolic compound and rate: 2,6-di-t-butyl-4 methyl phenol $3 \times 10^{-6}$ moles/mole of total monomer feed; reactor pressure: 33,000 psig. The experiment was concluded after 27 hours, during which time no explosive decomposition occurred.

It is obvious to those skilled in the art that many variations and modifications can be made to the process of this invention. All such departures from the foregoing specification are considered within the scope of this invention as defined by this specification and the appended claims.

What is claimed is:

1. In a continuous process for the production of ethylene-vinyl acetate copolymers in which
   (a) ethylene and vinyl acetate are introduced to a polymerization zone;
   (b) said ethylene and vinyl acetate are reacted in the presence of a free radical catalyst in said polymerization zone at elevated pressures and temperatures;
   (c) the resulting reaction mixture is passed from the polymerization zone through a pressure reduction zone into a separation zone;
   (d) the reaction mixture is separated into unreacted monomer and ethylene-vinyl acetate copolymer and
   (e) the unreacted monomer is recycled to the polymerization zone, the improvement which comprises: during step (c) introducing into the reaction mixture of unreacted monomer and ethylene-vinyl acetate copolymer at a location downstream from the polymerization zone a hindered phenolic compound in amounts ranging from about $6 \times 10^{-7}$ moles to about $4 \times 10^{-5}$ moles of phenolic nuclei per mole of total monomer feed to the polymerization zone.

2. The process of claim 1, wherein the pressure of the polymerization zone is maintained between about 20,000 psig and about 50,000 psig.

3. The process of claim 1, wherein the polymerization temperature is maintained between about 250° and about 600° F.

4. The process of claim 1 wherein the vinyl acetate content of the total monomer feed to the polymerization zone is maintained between about 0.5 and about 50 weight percent.

5. The process of claim 1 wherein the hindered phenolic compound is added at a rate of from about $2 \times 10^{-6}$ to about $3 \times 10^{-5}$ moles of phenolic nuclei per mole of total monomer feed.

6. The process of claim 1 wherein the free radical catalyst is a peroxy compound.

7. The process of claim 1 wherein the pressure of the separation zone is maintained in the range from about 3000 psig to about 6000 psig.

8. The process of claim 1 wherein the phenolic compound is the pentaerythritol tetraester of 3(3,5-di-t-butyl-4-hydroxy phenyl) propionic acid.

9. The process of claim 1 wherein the phenolic compound is 2,6-di-t-butyl-4-methyl phenol.

10. The process of claim 1 wherein the polymerization pressure is between about 23,000 psig and about 40,000 psig and the polymerization temperature is maintained between about 400° and about 550° F.

11. The process of claim 4 wherein said vinyl acetate content is maintained between about 1 and about 20 weight percent.

* * * * *